Nov. 2, 1954   J. E. HAWKINS   2,693,245
SEISMIC WAVE GENERATING APPARATUS
Filed Jan. 10, 1949   4 Sheets-Sheet 1
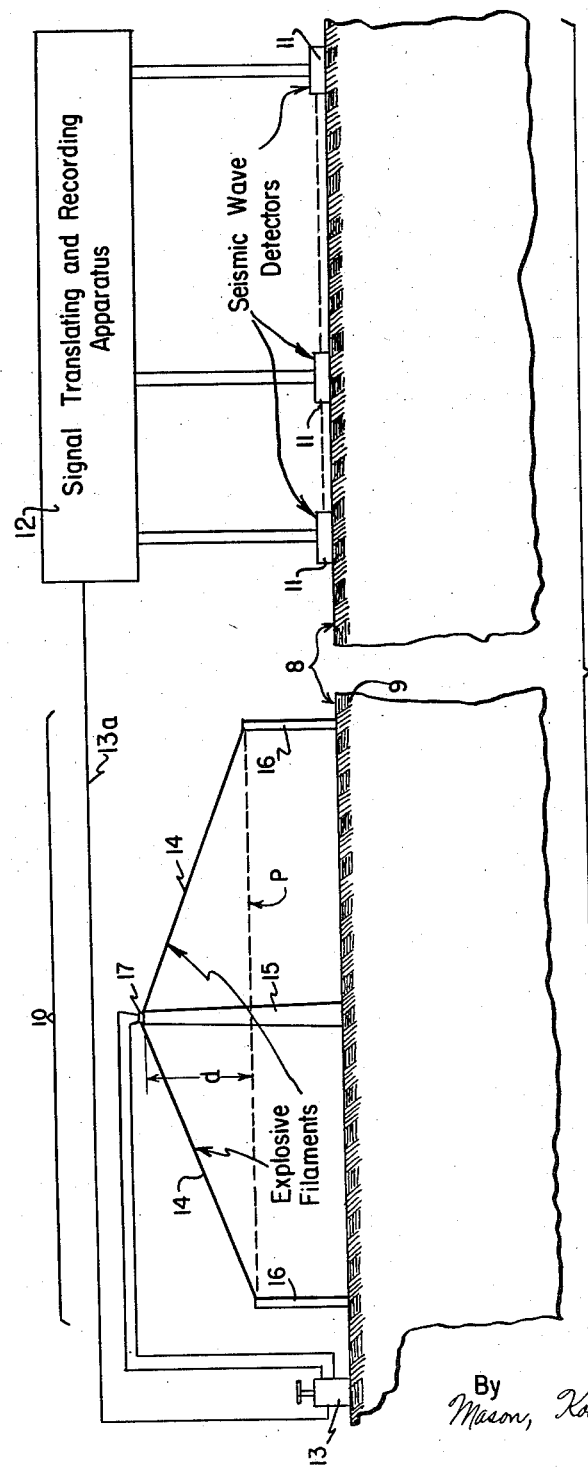
Inventor
James E. Hawkins
By
Mason, Kolehmainen, Rathburn & Wyss
Attys.

Nov. 2, 1954  J. E. HAWKINS  2,693,245
SEISMIC WAVE GENERATING APPARATUS
Filed Jan. 10, 1949  4 Sheets-Sheet 2
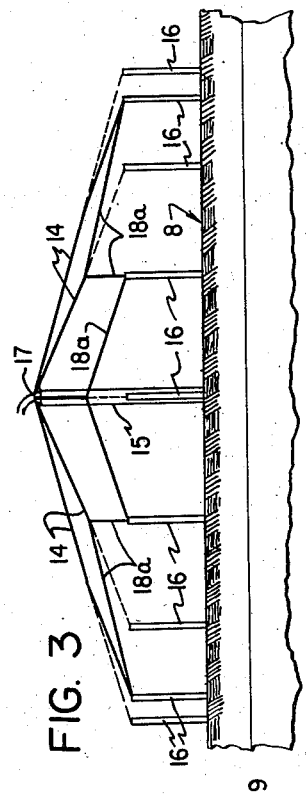
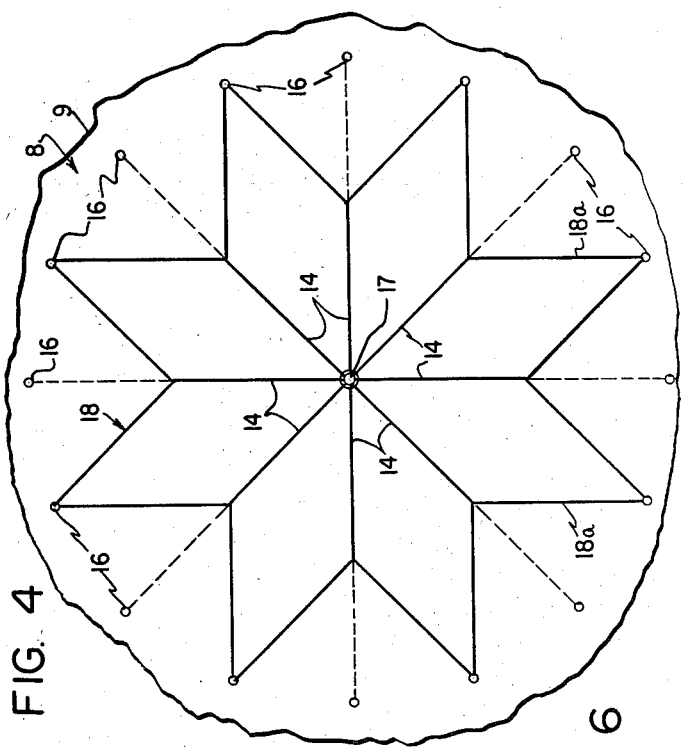
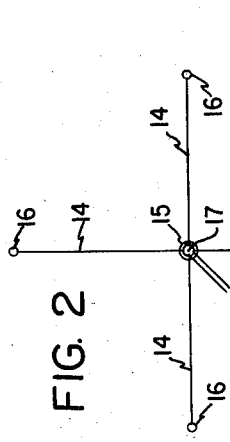
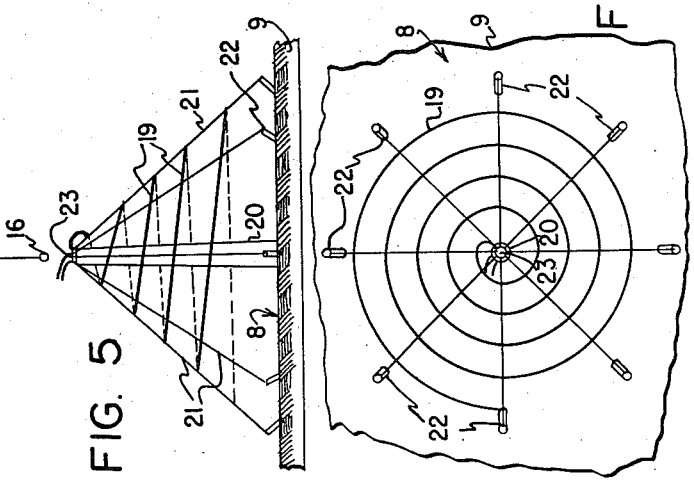
Inventor
James E. Hawkins
By Mason, Kolehmainen, Rathburn & Wyss
Attys.

Nov. 2, 1954     J. E. HAWKINS     2,693,245
SEISMIC WAVE GENERATING APPARATUS
Filed Jan. 10, 1949     4 Sheets-Sheet 3
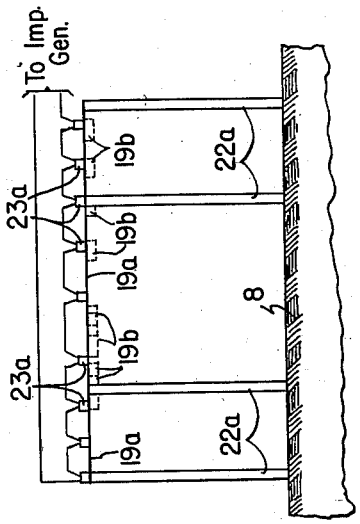
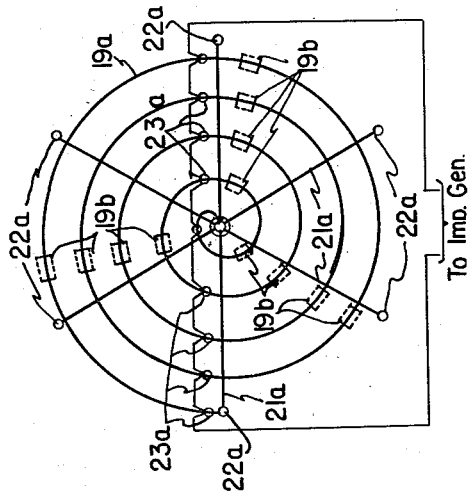
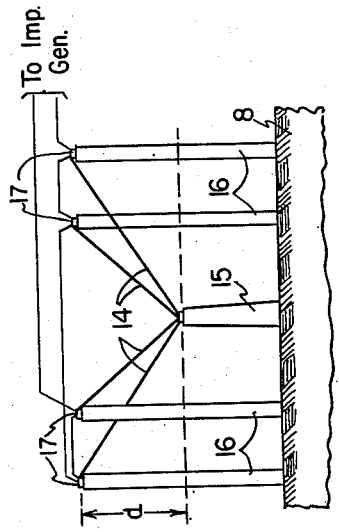
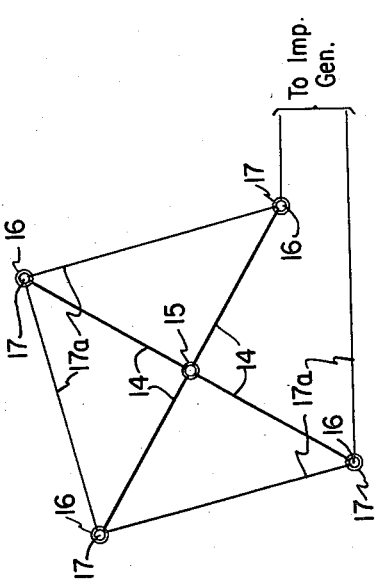
Inventor
James E. Hawkins
By Mason, Kolehmainen, Rathburn & Wyss
Attys.

Nov. 2, 1954    J. E. HAWKINS    2,693,245
SEISMIC WAVE GENERATING APPARATUS
Filed Jan. 10, 1949    4 Sheets-Sheet 4
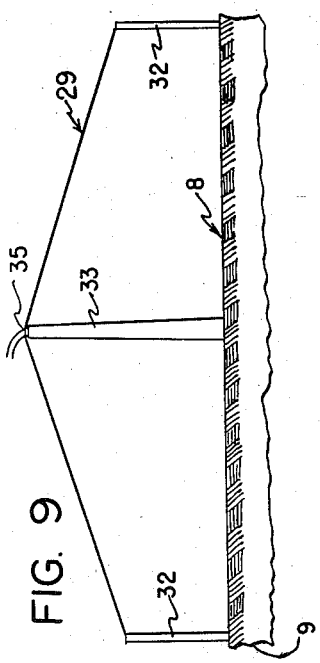
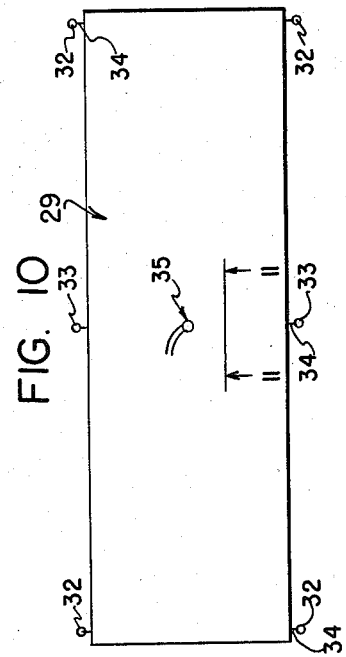
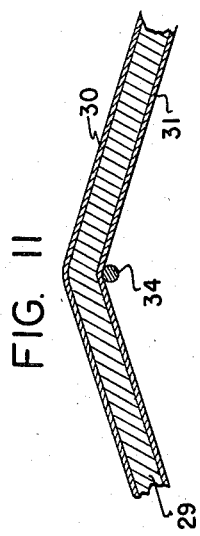
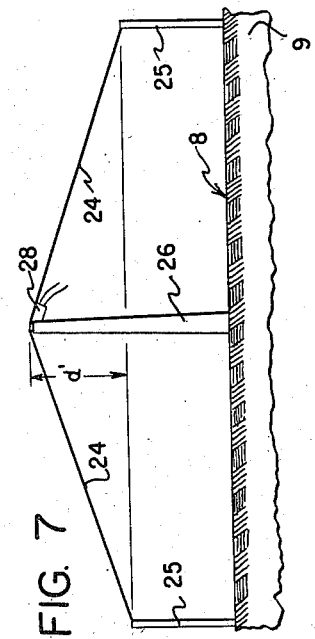
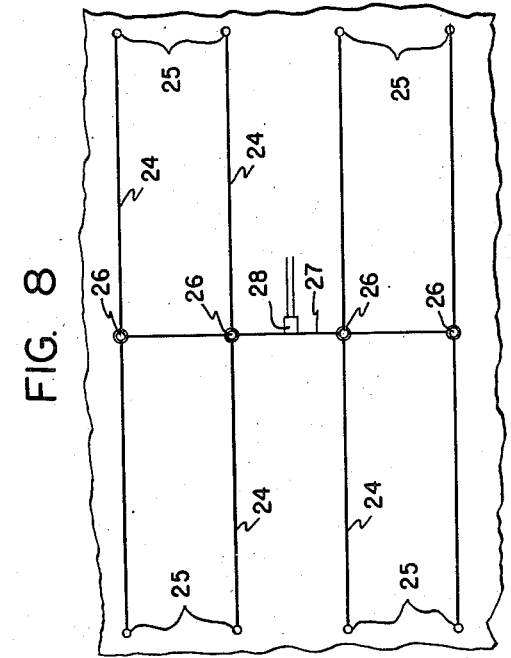
Inventor
James E. Hawkins
By Mason, Kolehmainen, Rathburn & Wyss
Attys.

United States Patent Office 2,693,245
Patented Nov. 2, 1954

2,693,245

SEISMIC WAVE GENERATING APPARATUS

James E. Hawkins, Tulsa, Okla., assignor to Seismograph Service Corporation, Tulsa, Okla., a corporation of Delaware Application January 10, 1949, Serial No. 70,075

4 Claims. (Cl. 181—0.5)

The present invention relates to the art of geophysical prospecting and more particularly to improved apparatus for generating seismic waves in the earth.

Fundamentally, the art of seismic surveying is based upon the generation of sound or seismic waves in the earth's crust and detecting, recording and interpreting the waves which are reflected and refracted back to the earth's surface from buried strata interfaces and the like. Present practice in the generation of seismic waves is that of detonating dynamite or other explosives, as commercially obtained in package form, or as placed in a suitable container, metal or otherwise, to facilitate loading, in a shot hole usually drilled below the weathering or low velocity layer of the earth's crust. Various arrangements have been proposed for generating seismic waves above the surface of the earth in order to avoid the cost of drilling the shot holes in which the explosive charges are deposited. Other advantages are claimed for this method of seismic wave generation, including those of producing better wave reflection and refraction records, and minimizing ground disturbance at the shot points. One such arrangement of this character is disclosed in McCollum Patent No. Re. 17,242, granted March 19, 1929. As pointed out in this patent, best results are obtained if the wave generating source is arranged to produce a wave front striking the surface of the earth which is substantially planar in form. In the arrangement disclosed by McCollum, this is accomplished by locating the explosive charge high in the air (from 1000 to 2000 feet above the surface of the earth) in order to permit the wave front developed upon detonation of the charge to expand and reduce the radius of curvature thereof. This proposal has the disadvantage of being somewhat inefficient in that a substantial portion of the energy developed upon detonation of the charge is dissipated in propagating the wave front from the point where the charge is detonated through the air to the surface of the earth. Morever, it is somewhat difficult and costly to elevate the explosive charges to the desired height and detonate the same.

It is an object of the present invention, therefore, to provide improved apparatus for generating seismic waves in the earth.

It is another object of the invention to provide improved seismic wave generating apparatus for developing seismic waves above the surface of the earth which is not characterized by the above-noted disadvantages and yet is characterized by all of the advantages attributable to this method of seismic wave generation.

It is a further object of the invention to provide improved seismic wave generating apparatus which is easy to handle, simple to set up in preparation for a shooting operation, does not require the use of shot holes and yet from the standpoint of cost of explosives for a given shooting operation, is comparable with the methods of seismic wave generation currently in use.

In general, the above objects are realized in accordance with the present invention by providing apparatus for generating seismic waves in the earth which comprises at least one and preferably an array of thin elongated elements (a filament or sheet) of explosive material extending between two relatively widely separated points, and apparatus for detonating the explosive element or elements.

The invention, both as to its organization and method of operation, together with further objects and advantages thereof will best be understood by reference to the following specification taken in connection with the accompanying drawings in which:

Fig. 1 illustrates a seismic surveying system embodying apparatus for generating seismic waves in the earth characterized by the features of the present invention;

Fig. 2 is a plan view of the seismic wave generating apparatus shown in Fig. 1;

Fig. 3 is a side elevational view illustrating a modified embodiment of the present improved seismic wave generating apparatus;

Fig. 4 is a plan view of the apparatus shown in Fig. 3;

Fig. 3A is a side elevational view illustrating a different embodiment of the invention;

Fig. 4A is a plan view of the apparatus shown in Fig. 3A;

Fig. 5 is a side elevational view illustrating another embodiment of the present improved seismic wave generating apparatus;

Fig. 6 is a plan view of the apparatus shown in Fig. 5;

Fig. 5A is a side elevational view illustrating a further embodiment of the invention;

Fig. 6A is a plan view of the apparatus shown in Fig. 5A;

Fig. 7 is a side elevational view illustrating still another embodiment of the present improved seismic wave generating apparatus;

Fig. 8 is a plan view of the apparatus shown in Fig. 7;

Fig. 9 is a side elevational view illustrating a further embodiment of the present improved seismic wave generating apparatus;

Fig. 10 is a plan view of the apparatus shown in Fig. 9; and

Fig. 11 is a fragmentary sectional view taken along the line 11—11 in Fig. 10.

Referring now to the drawings and more particularly to Fig. 1 thereof, the present improved seismic wave generating apparatus is there illustrated in its embodiment in a seismic surveying system which comprises the usual signal translating and recording apparatus 12 for amplifying, filtering and recording detected seismic wave signals derived from an array of geophones or signal detectors 11. These detectors may be arranged in any desired array relative to and distant from the present improved seismic wave generating apparatus 10. As pointed out more fully below, detonation of the explosive material embodied in the apparatus 10 is effected under the control of a conventional electric impulse generator 13 which may be electrically connected by means of a cable 13a with one of the signal translating channels of the apparatus 12 for the purpose of transmitting the "time-break" signal to one of the recording elements of the recorder embodied in this apparatus. The generator 13, together with the signal detectors 11 and the signal translating and recording apparatus 12, may be of any desired commercial construction.

In general, the mode of operation of the system as thus far described will be readily understood by those skilled in the art. Briefly, however, seismic signals generated in the manner pointed out more fully below by the wave generating apparatus 10 remote from the array of detectors 11, and as transmitted through the earth both directly and through reflection and refraction from buried strata interfaces and the like, are picked up by the detectors 11, converted into corresponding electrical signals through the operation of these detectors, amplified through the respective amplifying channels of the apparatus 12 and impressed upon the respective driving coils of the galvanometer elements embodied in the recorder of the apparatus 12 for photographic reproduction. Also in accordance with conventional practice the time-break signal, as produced simultaneously with detonation of the explosive material embodied in the apparatus 10, is transmitted over the cable 13a and through at least part of one of the amplified channels of the apparatus 12 to one of the recording elements of the recorder embodied in this apparatus for photographic reproduction.

As pointed out above, the conventional method of generating seismic waves is that of drilling a shot hole from the earth's surface 8 through the weathering or low velocity layer 9 of the earth's crust, depositing an explosive charge in the form of cavitated dynamite at the bottom of the shot hole and detonating the charge. This system of seismic wave generation is characterized by the disadvantages briefly outlined above. In accordance with the present invention these disadvantages are at least in part obviated through use of the present improved seismic signal generating apparatus. The particular embodiment of this apparatus illustrated in Figs. 1 and 2 of the drawings comprises a plurality of thin elongated elements or filaments 14 of explosive material which are supported in tension above the surface 8 of the earth's crust and radiate generally outward from a common point to cover an enlarged explosion area. In the arrangement illustrated, four explosive filaments or filamentary segments 14 are provided, but it will be understood that as many filaments may be employed as desired, all of which radiate outward from a common center point. In fact and as pointed out more fully below, certain advantages are realized by substantially increasing the number of filamentary segments of explosive material which radiate from the common center point. Although any filamentary type explosive material having the desired characteristics may be employed, the explosive filaments herein disclosed are preferably of the type known and sold commercially as Primacord. The supporting means for the filaments 14 comprises a center stake or pole 17 and a plurality of outer stakes or poles 16 which are driven into the earth to extend vertically upward from the earth's surface 8. The explosive filaments 14 are tied to and extend between the upper ends of the supporting poles. More in detail, each explosive filament 14 extends from the top of the center pole 15 outwardly to the top of one of the outer poles 16. At the top of the center pole 15, the inner ends of the explosive filaments 14 are tied together and connected in contact with a conventional electric impulse type detonator 17 which, upon excitation by the electrical impulse generator 13, functions substantially simultaneously to detonate the explosive filaments 14 at the inner ends thereof.

When the explosive filaments 14 are detonated at the common point at which the detonator 17 contacts the inner ends thereof, explosive forces are generated at each filament which radiate outwardly from the filament in all directions. These forces as developed at each filament 14 produce a large wave disturbance in the air having a wave front which travels in an expanding circle away from the filament as a center. It will be apparent that wave front travel away from each filament 14 is first initiated at the upper inner end of the filament and proceeds rapidly outward as the filament is progressively detonated. The time required for completing detonation of a given segment of any one of the filaments 14 is commonly referred to in the art as the "propagation interval" or "propagation time" and it is in this sense that the quoted terms are used herein. In other words, it takes a certain definite time interval for complete detonation of each filament 14 to occur and this interval is commonly known as the propagation interval. It will be understood that during this interval the wave front generated at the upper end of each filament 14 will travel a predetermined distance radially outward from the filament in the surrounding air. This means that if the filaments 14 are all disposed in a common horizontal plane located above and parallel to the earth's surface 8, the wave fronts radiated outward from the inner upper end of the filaments 14 will strike the earth's surface ahead of the wave fronts originating at the outer ends of the filaments. In other words, wave front impact with the earth's surface 8 would start approximately at the base of the center pole 15 and progress radially outward beneath the filaments 14 during the propagation intervals of these filaments. Thus the desired end of simultaneous impact of the entire wave front with the earth's surface would not be obtained.

In accordance with an important feature of the present invention, the difficulty just mentioned is obviated by elevating the inner end or detonating point of each filament 14 above the outer end by an amount "d" substantially equal to the distance traveled by the detonating wave away from the inner end of the filament during the propagation interval of the filament. This may be conveniently accomplished by making the center supporting pole 15 higher than the outer poles 16 by a distance $d$. By way of specific example, if the length of each filament is 100 feet and the rate of propagation of the detonating wave along each filament is 20,000 feet per second, the propagation interval of each filament is .005 second. During this interval, the wave front generated at the upper end of each filament travels approximately five feet vertically downward toward the earth's surface 8. Hence, the inner upper end of each filament 14 should be displaced above the outer end of the filament a distance "d" of approximately five feet.

By elevating the inner ends of the filaments 14 in the manner described, the expanding wave fronts developed upon progressive detonation of the filaments radially outward from the inner ends thereof all reach a common plane P at the same time and travel downward together to contact the earth's surface 8 simultaneously. As a result, the impact of the explosive energy on the earth's surface 8 is in the form of an exceedingly short impulse rather than a prolonged disturbance of the earth's surface. In this connection, it will be understood that since the explosive material is in the form of thin filaments, the wave fronts developed upon detonation thereof are of expanding conical form, each wave front cone having one of the filaments 14 as its longitudinal axis. Hence, the overall wave front which impacts the earth's surface 8 is not truly a plane but is made up of four curved wave front segments the leading surfaces of which contact the earth's surface simultaneously and the trailing surfaces of which contact the earth's surface 8 at progressively later instants determined by the radius of curvature of the wave front segments. However, the overall wave front definitely simulates a plane. Moreover, the planar effect may be emphasized by employing additional explosive filaments 14 radiating outward from the top of the center pole 15 to the top of additional supporting poles 16 and disposed between the four illustrated explosive filaments 14. In this way, the valleys between the wave front segments may be filled up to produce an overall wave front which more nearly approximates a true plane. It will be understood that the described wave front impact with the surface of the earth causes waves to travel downwardly through the earth for reflection and refraction from buried strata interfaces in the manner explained above.

Referring now more particularly to Figs. 3 and 4 of the drawings, the modified embodiment of the invention there illustrated is generally similar in structural arrangement with that shown in Figs. 1 and 2 and described above. However, the overall wave front developed upon detonation of the explosive filaments 14 in response to excitation of the detonator 17 is caused more nearly to approximate a true plane over the area of impact with the earth's surface 8 by providing eight of these filaments instead of four and by connecting the outer ends thereof to an additional explosive filament 18 which is connected with the outer ends of the filaments 14. More specifically, the filament 18 is anchored at equally spaced points therealong to the upper ends of the outer supporting poles or stakes 16. In this manner and by using the filaments 14 to pull up the slack in the filament 18 between the points at which the latter filament is connected to the poles or stakes 16, an array of explosive filaments is provided which in top plane view approximates an eight pointed star. In this arrangement also, the inner connected ends of the filaments 14 are disposed above the supported points of the filament 18 by an amount substantially equal to the distance traveled by the detonation wave in air during the filament propagation interval; this for the purpose of obtaining an overall wave front which approximates a horizontal plane at the moment of impact with the earth's surface 8 in the manner explained above. It will be understood that since a greater number of filaments 14 are employed and the explosion filament 18 is added to the array, detonation of the filamentary system at the inner connected ends of the filaments 14 results in the production of a composite traveling wave front which very closely approximates a true plane. In other words, inclusion of the added filaments in the array has the effect of minimizing the magnitude of the peaks and valleys in the overall wave front produced in the explosion area. This effect may be further enhanced by extending the radially directed explosive filaments 14 beyond the tie points with the filament 18 to additional stakes or poles 16 in the manner indicated in dashed lines in Fig. 4 of the drawings.

Another arrangement for reducing the magnitude of the peaks and valleys in the overall wave front produced in the explosion area and for more effectively blanketing the explosion zone with the traveling wave front is illustrated in Figs. 3A and 4A. As there shown, the outer supporting poles 16 are higher than the center supporting pole 15 by an amount "d" equal to the distance traveled by the detonation wave downwardly during the propagation interval of each explosive filament 14. In this arrangement, facilities comprising detonators 17 individually contacting the filaments 14 at their outer ends are provided for simultaneously detonating the filaments at the outer ends thereof. If desired, simultaneous detonation of the detonators 17 may be effected by employing conductors 17a to connect the detonators in series across the terminals of a common electric impulse generator, not shown, similar to the generator 13 illustrated in Fig. 1 of the drawings.

The expanding conical wave front developed about the filaments 14 of Figs. 3A and 4A upon simultaneous detonation of the filaments at the outer ends thereof are similar to those developed upon detonation of the explosive filaments used in the arrangements of Figs. 1 to 4, inclusive, except that the wave front cones taper inwardly toward the center of the explosion zone. In other words, the wave fronts produced by the individual filaments are substantially wider around the outer perimeter of the explosion zone than the wave fronts produced by using the arrangement of Figs. 1 and 2, for example. As a result the explosion area is more effectively blanketed by the wave fronts produced by a given number of explosive filaments and the peaks and valleys in the overall wave front, particularly at the outer margin of the explosion zone, are less pronounced.

Referring now more particularly to Figs. 5 and 6 of the drawings, the embodiment of the invention there illustrated comprises a single continuous filament 19 of explosive material which is arranged to define a conical spiral. More specifically, the supporting structure for the filament 19 comprises a center pole 20 driven into the earth to extend vertically upward therefrom, small stakes 22 driven into the ground at spaced points around the circumference of a circle having the pole 20 as a center, and supporting wires 21 connected between the stakes 22 and the upper end of the center pole 20. After this supporting structure is formed, the filament 19 of explosive material may be supported thereon by connecting one end of the filament to the upper end of the pole 20 and spirally winding the filament around the wires 21. If desired, the lower end of the filament may be suitably tied or otherwise fastened to one of the supporting wires 21. A detonator 23 of the electric impulse type is connected to the upper end of the filament 19 to effect detonation thereof and may be arranged for excitation by an electrical impulse generator of the character indicated at 13 in Fig. 1 of the drawings.

When the detonator 23 of the apparatus shown in Figs. 5 and 6 is excited, the explosive filament 19 is progressively detonated along the spiral convolutions thereof from the upper end to the lower end thereof. Incident to such progressive detonation, expanding circular detonating waves are generated progressively along the filament. In this regard, it is pointed out that the spacing of the spiral convolutions along the support wires 21 is such that propagation of the detonating wave along the filament precedes arrival of the detonating wave through the air from a previously detonated segment of the filament, thereby to prevent displacement of the filament turns from their supported positions prior to detonation thereof. It is also pointed out that the rate at which the elevation of the filament decreases along the filament turns is so proportioned that the overall wave front formed at the base of the cone just prior to impacting the earth's surface 8 is substantially planar in form. The two requirements just referred to are entirely compatible since the circularly expanding wave front generated upon detonation of any small segment of the conically spiralled filament must travel a greater distance through the air to reach the nearest segment of the next lower filament turn than it must travel to reach the horizontal plane parallel to the earth's surface 8 in which the nearest segment of the next lower filament turn is disposed. It will be understood, therefore, that by properly determining the apex angle of the cone and properly spacing the turns of helically spiralled filament 19 and detonating the spiral at the apex of the cone, a detonation wave front may be generated to strike the earth's surface 8 which is substantially planar in form.

Referring now more particularly to Figs. 5A and 6A of the drawings, a modified arrangement is there illustrated in which the explosive filament 19a is arranged in the form of a flat spiral and facilities comprising a plurality of detonators 23a individually associated with different convolutions of the spiral are provided for simultaneously detonating the filament at a plurality of points along the length thereof. The flat spiralled filament 19a is supported by a supporting structure which comprises a center pole and a plurality of outer poles 22a, all driven into the earth's surface and extending upright the same height above the earth's surface. At the tops thereof, these poles support wires 21a, each of which extends between the top of the center pole and the top of one of the outer poles 22a. The system of supporting wires thus provided may be utilized to support the convolutions of the explosive filament 19a and also the detonators 23a in a plane which is substantially parallel with the earth's surface 8. If desired, the explosive energy developed upon detonation of the filament 19a may be enhanced by using dynamite sticks 19b which extend lengthwise along the filament 19a and are taped or otherwise secured to the convolutions of the filament 19a at spaced points therearound in the manner illustrated in dashed lines in Figs. 5A and 6A of the drawings. In order to effect simultaneous detonation of the filament 19a at a plurality of points along the convolutions thereof, the detonators 23a are preferably connected in series across the terminals of a common impulse generator, not shown, similar to the generator 13 illustrated in Fig. 1 of the drawings.

When the detonators 23a, as shown in Figs. 5A and 6A, are simultaneously detonated, the filament 19a is detonated at the points of contact with the several detonators, with the result that the different segments of the explosive filament 19a extending between the detonators are progressively detonated from the ends of each segment in opposite directions toward the center of each segment. Incident to such detonation of the filament segments, the dynamite sticks 19b, if provided, are also detonated to increase the amount of explosive energy developed. With this arrangement, the contour of the overall wave front developed beneath the explosive filament 19a over the explosion area is somewhat complex in character. However, since the filament is detonated at a plurality of discrete and separated points along the length thereof, the propagation times of the filament segments are so short that the overall wave front generally approximates a plane in the zone between the earth's surface 8 and the filament 19a. It will thus be apparent that the arrangement shown in Figs. 5A and 6A provides for the generation of an explosive wave front over the explosion area which is of generally planar configuration without requiring displacement of the explosive filament or segments thereof progressively closer to the earth's surface.

In the modified embodiment of the invention illustrated in Figs. 7 and 8 of the drawings, a plurality of parallel laterally spaced apart explosive filaments 24 are arranged to define an explosion area therebeneath which is of substantially rectangular configuration. Specifically, each filament 24 is connected at its opposed outer ends to the tops of spaced poles or stakes 25 and has its midpoint held in a predetermined position above its outer ends by means of a center stake or pole 26. Detonation of the explosive filaments 24 at the respective midpoints thereof may be substantially simultaneously effected by contacting the filaments 24 at their midpoints with individual electrical impulse type detonators which are excited in series or parallel from a common electric impulse generator. Alternatively, the explosive filaments 24 may be detonated by employing an additional explosive filament 27 which extends transversely across the filaments 24 and contacts the same at the midpoints thereof and which in turn is arranged for detonation by an electric impulse detonator 28 disposed at the center of the filament 27. If the first-described method of filament detonation is employed, detonation waves are propagated simultaneously outward in both directions along the filaments from the midpoints thereof. On the other hand, if the cross filament 27 is used in conjunction with the detonator 28 to effect detonation of the long filaments 24, the detonation wave travels in both directions along the filament 27 and spreads outwardly in both directions along each filament 24 as it reaches the junction point between the filament 27 and each filament 24. The lateral spacing between the parallel extending filaments 24 is preferably such that the laterally directed explosive energy developed upon detonation of the filaments is partially cancelled. This may be accomplished by spacing the filaments apart a distance equal to one-half the wavelength of the predominant wave frequency developed upon detonation of the filaments or an integer multiple of this distance, such that the waves of the predominant wave frequency developed at adjacent filaments are in phase opposition at points spaced laterally from the filaments. As an alternative arrangement, the explosive filaments may be relatively closely spaced so as to approximate a thin sheet of explosive material, with the result that the overall wave front developed below the filaments upon detonation thereof more closely approximates a plane.

The character of the downwardly directed wave front which strikes the earth's surface 8 in response to detonation of the filaments 24 is substantially the same as that produced by the embodiments of the invention illustrated in Figs. 1 to 6, inclusive, except that it is rectangular in pattern rather than of circular pattern. Here also, the purpose of elevating the midpoints of the filaments 24 above the outer ends of these filaments is that of insuring simultaneous arrival at the earth's surface 8 of the component wave fronts developed during progressive outward detonation of the respective filament segments from the midpoints thereof. In other words, the vertical displacement "d'" between the midpoints of the filaments 24 and the outer ends of the filaments is substantially equal to the distance traveled by the detonating wave vertically downward in air during the propagation interval required for the detonation wave to travel from each filament midpoint to the respective outer ends of the filament. If the cross filament 27 is used to effect detonation of the long filaments 24, compensation for the propagation time along the filament 27, which results in slightly delayed detonation of the two outer filaments 24, may be obtained by disposing the outer filaments parallel with but slightly closer to the earth's surface 8 than the two inner filaments 24 and by arranging the filament 27 in the form of an inverted V across the long filaments 24 with the detonator 28 located at the apex of the V. Such modification of the arrangement shown in Figs. 7 and 8 has the effect of minimizing the peaks and valleys in the overall wave front which strikes the earth's surface 8 upon detonation of the filament array.

From the preceding explanation, it will be understood that the overall wave front produced in response to detonation of the filament array shown in Figs. 7 and 8 of the drawings is characterized by a series of valleys at the moment of impact with the earth's surface 8, these valleys being disposed below and between each adjacent pair of filaments 24. In order to eliminate these valleys, the arrangement illustrated in Figs. 9 and 10 may be employed. As there shown, the explosive material is in the form of a thin elongated sheath 29 which is supported between upper and lower strips 30 and 31 of wax paper or the like and has a width substantially coextensive with the width of the desired explosion area. This sheath of explosive material is supported in the desired position above the earth's surface 8 by means of a supporting structure which comprises four end poles 32 and two center poles 33 all of which are driven into the earth and extend vertically upward from the earth's surface 8. Supporting wires 34 are strung between the upper ends of each pair of poles. In using this supporting structure, one end of the elongated strip of explosive material 29 is wrapped around and securely fastened to the wire 34 extending between two of the end poles 32, following which the strip of explosive material is laid over the supporting wire 34 extending between the tops of the center poles 33, pulled taut and the other end thereof is wrapped around and securely anchored to the third supporting wire 34 extending between the tops of the other pair of end poles 32. A detonator 35 contacting the sheath of explosive material 29 at the center of the strip may be employed to effect detonation of the explosive material. When the explosive material 29 is thus detonated at the midpoint of the sheath, detonation proceeds in both directions outward from the sheath midpoint to the ends of the sheath. Thus a wave front is produced across the sheath which travels from the midpoint of the sheath outwardly towards the ends of the sheath. Due to the height differential between the sheath midpoint and the ends thereof, the overall wave front developed beneath the sheath to impact the earth's surface 8 is of substantially true planar configuration for reasons which will be entirely apparent from the preceding explanation. In this regard it will be apparent that since a thin flat sheath of explosive material is employed rather than displaced explosive filaments, the wave front is not characterized by peaks and valleys at the instant of impact with the earth's surface. The only departure of the wave front from a true plane is that brought about by the delay between detonation of the center portions of the strip and the outer edge portions thereof. This departure may be minimized by employing a plurality of detonators 35 arranged in a line across the sheet 29 at the center of the strip and detonating these detonators simultaneously. It may also be minimized by so supporting the strip 29 that the longitudinal center thereof is elevated slightly above the outer long edges of the strip, i. e., so that the strip in transverse cross section is in the form of an inverted V. With the latter arrangement, the time required to detonate the strip 29 from its center laterally outward to the edges is compensated for by the greater distance the wave front developed at the center portion of the strip has to travel in order to reach the earth's surface, such that all portions of the overall wave front strike the earth simultaneously.

Although all embodiments of the present improved apparatus have been described with particular reference to disposition of the explosive material above the surface of the earth, it will be apparent that the illustrated explosive filament and sheath arrays may be used to advantage when disposed at or below the surface of the earth. Thus in certain areas, detonation of the explosive material above the surface of the earth may not be practical due to the proximity of buildings or animals. In such cases, the various arrays of explosive filaments and particularly those illustrated in Figs. 1 to 4, inclusive, and 7 to 11, inclusive, may be used to advantage either directly at the surface of the earth or in shallow trenches dug beneath the surface of the earth. If either of the two last-mentioned arrangements is employed, it is not necessary that the described vertical displacement between the outer ends of the filaments and the inner ends or midpoints thereof be maintained since the major advantages of this particular feature of the invention are only realized when the explosive elements are located above the surface of the earth. The several embodiments of the invention herein disclosed may also be employed in conducting seismic prospecting operations over water covered areas of the earth's surface, in which case any one of the various arrangements may be positioned at, above or below the surface of the water in setting up for a shooting operation.

From the foregoing explanation, it will be understood that the present improved seismic wave generating apparatus is not only characterized by all of the advantages which may be attributed to seismic wave generation above the surface of the earth, but in addition is simple in the extreme and requires practically no equipment to perform a setting up operation. Thus the basic components are filament or strip type explosive materials which may be coiled for transportation, and suitable supporting stakes or poles. These components, together with the required filament or sheath tying means and the detonators, may be transported in disassembled form and set up with a minimum of effort at any desired location.

While different embodiments of the invention have been described, it will be understood that various modifications may be made which are within the true spirit and scope of the invention as defined in the appended claims.

I claim:

1. Apparatus for generating seismic waves in the earth, comprising spaced supports extending upward from the surface of the earth, a thin elongated element of explosive material supported in tension by said supports and extending therebetween above the surface of the earth, one of the points of support of said element being disposed above the other point of support of said element by an amount approximately equal to the distance traveled by the detonating wave away from said one point of support during the propagation time of said element between said two points of support, and means for detonating said element adjacent said one point of support.

2. Apparatus for generating seismic waves in the earth, comprising a plurality of elongated filamentary segments of explosive material, means supporting said segments in spaced apart relationship above the earth's surface to define an enlarged explosion area, each of said segments having one end thereof disposed above the other end thereof by an amount approximately equal to the distance traveled by the detonating wave away from said one end during the propagation interval of the segment, said one end of said segment being disposed in a common plane, and means for detonating said segments at said one end thereof.

3. Apparatus for generating seismic waves in the earth, comprising a plurality of laterally spaced apart and elongated filaments of explosive material, means supporting said filaments above the surface of the earth in substantially parallel relationship with the midpoints thereof elevated above the outer ends thereof, the vertical distance between the outer ends of each of said filaments and the midpoint thereof being approximately equal to the distance traveled by the detonating wave away from the midpoint of the filament during the propagation time from the filament midpoint to the outer end thereof, and means for substantially simultaneously detonating said filaments approximately at the midpoints thereof.

4. Apparatus for generating seismic waves in the earth, comprising a plurality of laterally spaced apart and elongated filaments of explosive material, means supporting said filaments above the surface of the earth in substantially parallel relationships with the midpoints thereof elevated above the outer ends thereof, the lateral displacement between said filaments being such that the laterally directed explosive energy developed upon detonation of said filaments is at least partially cancelled and the vertical distance between the outer ends of each filament and the midpoint of the filament being approximately equal to the distance traveled by the detonating wave away from the midpoint of the filament during the propagation time of one half the filament length, an additional explosive filament extending across and contacting said plurality of filaments at their midpoints, and means for detonating said additional filament at substantially its midpoint, thereby to effect substantially simultaneous detonation of said plurality of filaments at the midpoints thereof.

References Cited in the file of this patent

UNITED STATES PATENTS

| Number | Name | Date |
|---|---|---|
| Re. 17,242 | McCollum | Mar. 19, 1929 |
| 152,053 | Striedinger | June 16, 1874 |
| 2,133,484 | Sherar | Oct. 18, 1938 |
| 2,340,314 | Farnham | Feb. 1, 1944 |
| 2,580,636 | Wolf | Jan. 1, 1952 |
| 2,609,885 | Silverman | Sept. 9, 1952 |

OTHER REFERENCES

Publication (Russian), "Experiment of Application of Air Explosions in Reflection Exploration" by A. A. Tsvetaef, Applied Geophysics (Organ of Federal United Geophysical Trust; Scientific Research Institution of Applied Geophysics; People's Commissoriat of Petroleum, U. S. S. R.) 1945, No. 1, 82–87.

"Explosives and Demolitions," War Department Field Manual FM–5–25, issued Feb. 29, 1944, pages 66, 67, 68, 70, 71, 100. (Copy available in Div. 70, U. S. Patent Office.)